Patented Apr. 30, 1940

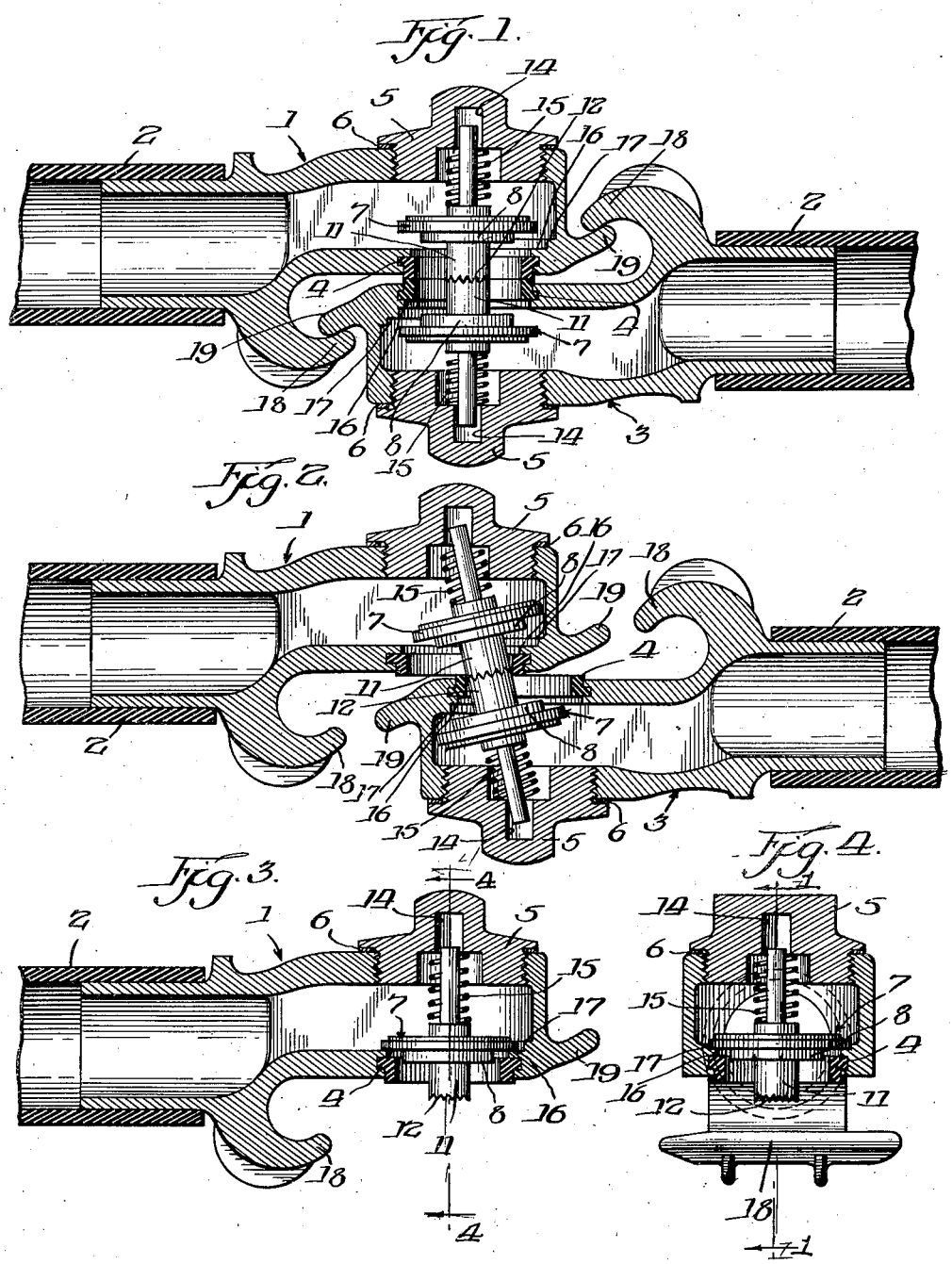

2,199,143

UNITED STATES PATENT OFFICE 2,199,143

AIR HOSE COUPLING

Herman Stholberg, Virginia, Minn.

Application October 8, 1938, Serial No. 234,003

2 Claims. (Cl. 284—10)

This invention relates particularly to the hose coupling for the air-brakes of railroad trains. It is an improvement on the air-brake hose coupling in general use and can be used interchangeably with such hose couplings.

The object of my invention is to provide an airbrake hose coupling which is complete in itself and does not require that a valve, such as the now used angle cock, must be closed before the coupling can be opened with safety, and which will at the same time provide for all of the needs of train service.

My work has brought me into close touch with the operation of trains and air-brake mechanism. I have seen several very painful accidents caused by the train-man neglecting to close the angle cocks before breaking the air-hose coupling. The out rushing air throws the flexible air-hose with such violence that the trainman is often painfully injured. My invention has been developed to provide a means for getting away from this danger without in any way impairing the air-brake service.

In addition to the safety feature of my invention it also has further value in that it prevents water and dirt from entering the air-hose coupling on the car which is at the end of the train and also on the cars which stand to the weather for long periods and under all conditions. Such accumulations, especially in winter weather often make it quite impossible to place the cars in the train until the air-hose has been repaired or replaced.

In the accompanying drawing which illustrates my invention and which forms a part of this specification:

Figure 1 is a section, on line 1—1 of Figure 4, through two air-hose couplings regularly coupled as in service;

Figure 2 is a section similar to Figure 1, excepting that the couplings are shown as being pulled apart, as when the car-couplings accidentally open;

Figure 3 is a longitudinal section on line 1—1 of Figure 4 showing normal closed position of the valve; and Figure 4 is a cross section of Figure 3 on line 4—4.

It will be observed that in the present development of my invention, as shown in the several views, I have used in so far as possible the same hose coupling as is used generally in rail-road work. Coupling bodies 1 and 3 are such bodies with the following changes: Seat 16 and ledge 17 are provided for purposes which will follow.

Provision has been made by providing the large tapped opening, for the insertion of valve 7. This opening is closed by the screwed plug 5 and the gasket 6.

Valve 7 is firmly attached to spindle 11 and is provided with the unseating disc 8 which is somewhat smaller than valve 7. Spindle 11 is guided in cap 5 by the guide hole 14, which is somewhat larger than the spindle 11 to permit valve 7 and spindle 11 to be cocked over as shown in Figure 2. Spring 15 keeps valve 7 to seat 16 and permits it to be lifted from this seat 16.

The locking ears 18 and 19, the sealing gasket 4 and the brake hose 2 are all identical with similar parts now in general use for the same purpose and require no explanation here, anymore than to show that my invention can be used in conjunction with apparatus now in general use.

It is now evident that when the air-hose couplings with my invention are disconnected normally, the valve 7 seats on seat ring 16, as shown in Figure 3, making a tight joint which will retain the train line pressure as would any other valve or cock. It is also evident that when two couplings equipped with my invention are coupled, as shown in Figure 1, both of the valves 7 are lifted from their seats 16 and allow full pressure of the air to pass through the train line as though valves 7 were not in the line. When such coupling is uncoupled deliberately by the train man in the regular performance of his duties, the two valves close naturally as shown in Figure 3, valves 7 seating on seats 16. Thus these valves retain the train line pressure and otherwise perform the same work as the angle cocks without requiring the separate closing effort, which, as stated, is frequently forgotten.

When, however, the car coupling opens by mistake and the air-hose couplings are pulled apart, as shown in Figure 2, the valve spindles 11, being in intimate contact through the tension springs 15, and because of the saw toothed ends 12 on the spindles 11, will not slide across each other but instead will pull each spindle 11 and valve 7 away from the regular seating plane as shown in Figure 2.

The looseness of spindle 11 in recess 14 permits of this pulling from the regular seating plane. Thus, it will be seen that instead of coming to its regular seat 16, the disc 8, being somewhat smaller than valve 7, lodges on seat 16 at a point in line with the direction of movement apart of the two couplings. In this position disc 8 does not make a seal for the train line pressure. The air therefore escapes from the disconnected couplings, thus causing the brakes of both sections of the broken train to be applied as necessary. The ledge 17 acts as an additional safeguard to the seating of valve 7 when the joint is broken accidentally.

When air-hose couplings containing my invention are used for coupling to a car not so equipped it is only necessary that the valve 7 be lifted from its seat with the fingers and slipped over into cocked position shown in Figure 2, thus allowing the train air to be carried through valve 7 as though it were not in the line.

One advantage of the present device resides in the fact that it eliminates the possibility of failure on the part of the brakeman in closing the angle cock before opening the coupling. This neglect has been the cause of many accidents since the air escaping under high pressure may swing the disconnected couplings and inflict serious injuries upon the brakeman. Freight cars are very often left standing in the open so that the hose coupler is subjected to various climatic conditions and if dirt or snow is picked up by the couplings the chances are the same may find its way into the air connections to cause damage to the cylinder and other operating parts thereof. In the present device the valve closes automatically when the coupling is disconnected and this prevents dirt and snow from entering the couplings in the first instance. Also the present device assures that the valve will be automatically opened when the couplings are connected so that the air line will be connected throughout the train and the brakes will be applied as required.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In an air brake hose coupling, a body member having connection with an air hose and adapted to be coupled to another body member of similar construction, each body member having an opening therein and said openings communicating with each other when the members are coupled, a valve for each opening yieldingly biased into closed position, and means extending from each valve having a serrated end, the serrated ends of said means engaging when the members are coupled to hold the valves open.

2. In an air brake hose coupling, a body member having connection with an air hose and adapted to be coupled to another body member of similar construction, said body member having an opening therein leading to the air hose, a valve for said opening located within the member and yieldingly biased into closed position, means depending from the outside surface of said valve, said means having a serrated lower end, and other means formed on the outside surface of said valve preventing the same from seating except when the valve is positioned substantially parallel to its seat.

HERMAN STHOLBERG.